United States Patent [19]

Bilsborough

[11] Patent Number: 5,124,114
[45] Date of Patent: Jun. 23, 1992

[54] MOVEMENT DETECTION SYSTEM

[75] Inventor: Roy Bilsborough, Congleton, England

[73] Assignee: NNC Limited, England

[21] Appl. No.: 521,317

[22] Filed: May 9, 1990

[30] Foreign Application Priority Data

May 10, 1989 [GB] United Kingdom ............... 8910784

[51] Int. Cl.⁵ ............................................ G21C 17/00
[52] U.S. Cl. ................................... 376/256; 376/245; 376/306; 376/210
[58] Field of Search ............... 376/245, 256, 306, 210

[56] References Cited

U.S. PATENT DOCUMENTS 4,259,152  3/1981  Pennell et al. ..................... 376/365
4,344,320  8/1982  Haupt et al. ........................ 73/40.7

FOREIGN PATENT DOCUMENTS 0011672  6/1980  European Pat. Off. .
0018536  11/1980  European Pat. Off. .
52-36284  3/1977  Japan ................................. 376/245
50111678  3/1977  Japan ................................. 376/245
1417108  12/1975  United Kingdom .
2111690  7/1983  United Kingdom .
2157879A  10/1985  United Kingdom ............. 376/245

*Primary Examiner*—Brooks H. Hunt
*Assistant Examiner*—Meena Chelliah
*Attorney, Agent, or Firm*—Kirschstein, Ottinger, Israel & Schiffmiller

[57] ABSTRACT

In a system for detecting abnormal movement of a part of a gas-cooled nuclear reactor, for example abnormal tilting of a boiler unit caused by failure of a boiler support, a tracer material is released into the gas coolant path in response to the movement. The releasing of the material may be effected by causing a gas canister to be pierced as a result of the movement. The presence of the tracer material in the coolant is detected by the coolant monitoring system.

11 Claims, 2 Drawing Sheets

MOVEMENT DETECTION SYSTEM

BACKGROUND OF THE INVENTION

1. Field of the Invention

This invention relates to a movement detection system for use in detecting movement of a body, such as abnormal movement resulting from failure of a member supporting the body. For example, the system may be used for detecting abnormal movement of a boiler unit in a nuclear reactor, caused by failure of a boiler support.

2. Description of Related Art

In the construction of advanced gas-cooled reactors (AGRs) a number of vertical boiler units are mounted around the reactor core and within the concrete pressure vessel. Heat is extracted from the core by passing carbon dioxide coolant gas over the fuel, and is transferred from the carbon dioxide coolant to the water in each boiler unit. The steam thereby produced drives a turbine to which is coupled a generator.

Each boiler unit is supported on horizontal beams, and these beams are subject to corrosion or erosion by the hot gas which flows around them. Eventually a support beam may fail, resulting in an abnormal movement of the boiler unit.

It is clearly necessary to provide a warning of such failure, and this has previously been effected by a number of different methods. In one such method, mechanical markers have been attached to the boiler units or their supports, so that a visual indication of abnormal boiler unit movement is given. However, such devices can be viewed only by inservice examination equipment during reactor shutdown. In an alternative method, cables which connect reactor temperature monitoring thermocouples to their associated indicators are located in such a manner that they will become severed in the event of abnormal boiler unit movement. This severing will be apparent from the lack of temperature indication. Such a method allows immediate detection of the abnormal movement without waiting for reactor shutdown. However, the method is not wholly reliable, since it is not possible to ensure that any undesirable movement of a boiler unit will necessarily give rise to severing of a cable.

SUMMARY OF THE INVENTION

It is an object of the present invention to provide an improved system for detection of movement within a nuclear reactor.

According to the invention there is provided a movement detection system for detecting abnormal movement of part of a nuclear reactor which reactor has a path therein for gaseous coolant, the system comprising means operable to release a tracer material into the coolant in response to said movement; and means to monitor the content of the coolant to detect the presence of the released material.

BRIEF DESCRIPTION OF THE DRAWINGS

The tracer material may be released from a container by the piercing of the container as a result of said movement.

An embodiment of the invention will now be described, by way of example, with reference to the accompanying drawings, in which.

DETAILED DESCRIPTION OF THE PREFERRED EMBODIMENT

Figure 1:
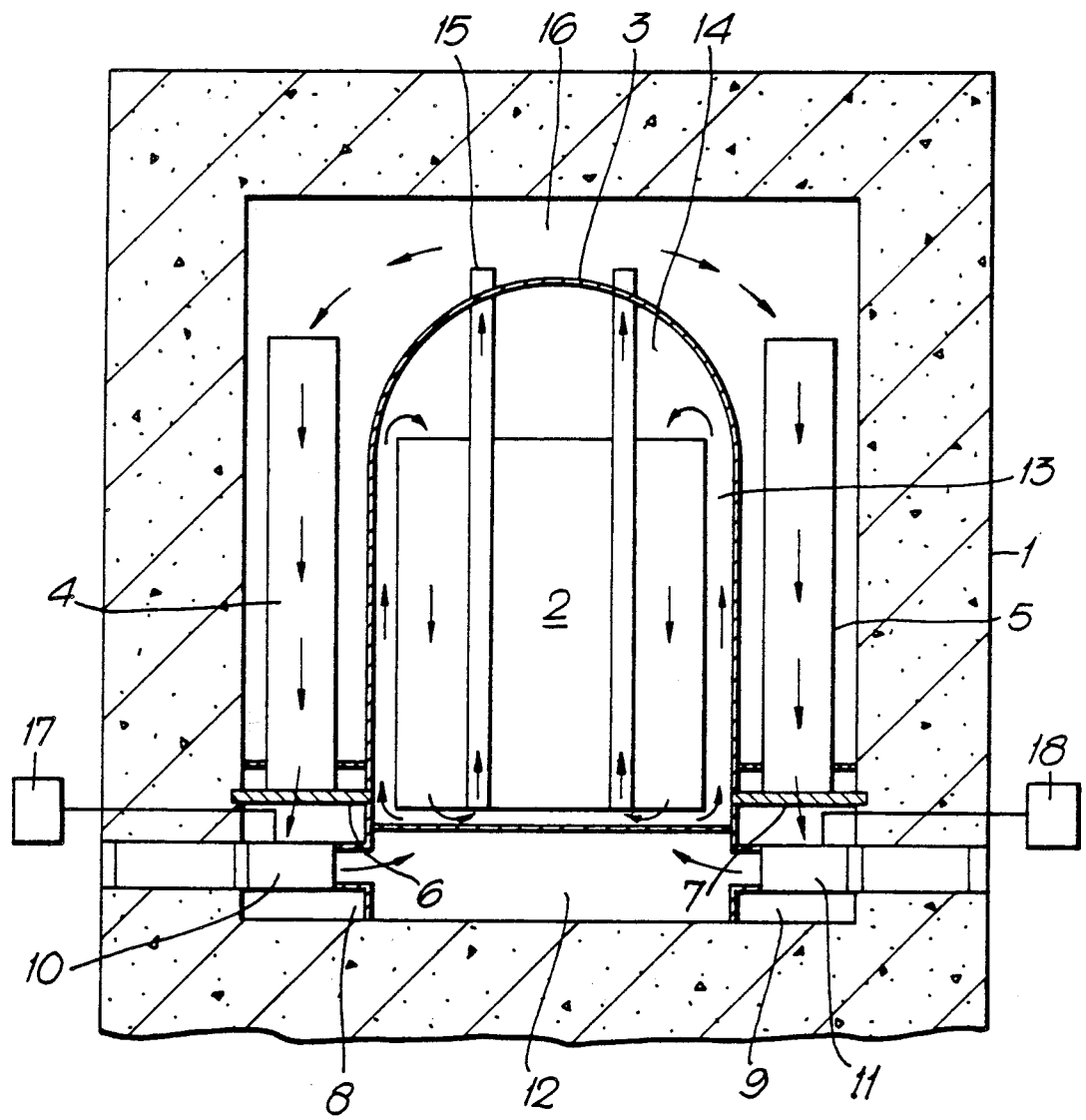
FIG. 1 is a block schematic diagram of part of an advanced gas-coolant reactor incorporating a movement detection system in accordance with the invention.

Referring to FIG. 1 of the drawings, an advanced gas-cooled reactor (AGR) includes a concrete pressure vessel 1 in which the reactor core 2 is mounted. The core is contained within a domed steel shell 3 which acts as a gas baffle. Vertical boiler units, such as the boiler units 4 and 5, are mounted around the core. There may be, for example, twelve boiler units arranged in four groups of three units, each group of units together constituting a boiler. The boiler units are contained in an annulus between the gas baffle 3 and the inner surface of the pressure vessel 1. The boiler units are mounted on horizontal beams, such as beams 6 and 7, which are supported at their ends by the pressure vessel 1 and the gas baffle 3.

Carbon dioxide coolant is circulated through the core to cool the fuel elements, and the carbon dioxide heated thereby passes downwards through the boilers, so that steam is generated for driving a turbine-generator unit (not shown).

Four quadrant plenum chambers, of which only two chambers 8 and 9 are shown, are provided beneath the respective boilers. Gas circulators, of which only two circulators 10 and 11 are shown, are provided to circulate the carbon dioxide coolant. The gas is drawn from the plenum chamber at the bottom of each boiler by the respective circulator, and is discharged into a sub-core plenum 12. The gas flow then splits, part enters the bottom of the fuel channels directly and the remainder passes firstly up an annular passage 13 between the outside of the core 2 and the inner surface of the gas baffle 3. This latter flow, after entering the hemispherical space 14 within the gas baffle 3 and above the core 2, passes down through the core structure through special passages until, at the bottom of the core, it combines with the above-mentioned direct flow. The combined flow then passes up the fuel channels and passes via tubes or pipes 15 through the hemispherical space 12 of the gas baffle to enter an upper plenum 16. The hot gas is drawn down through the boilers and back to the circulators.

The carbon dioxide is continuously monitored and processed to maintain the correct coolant composition. For example, oxygen and methane are injected into the coolant by monitoring and processing equipment at each circulator, such as equipments 17 and 18.

The existence of the coolant monitoring equipment makes it possible to provide a simple boiler movement detection system in accordance with the present invention.

Figure 2:
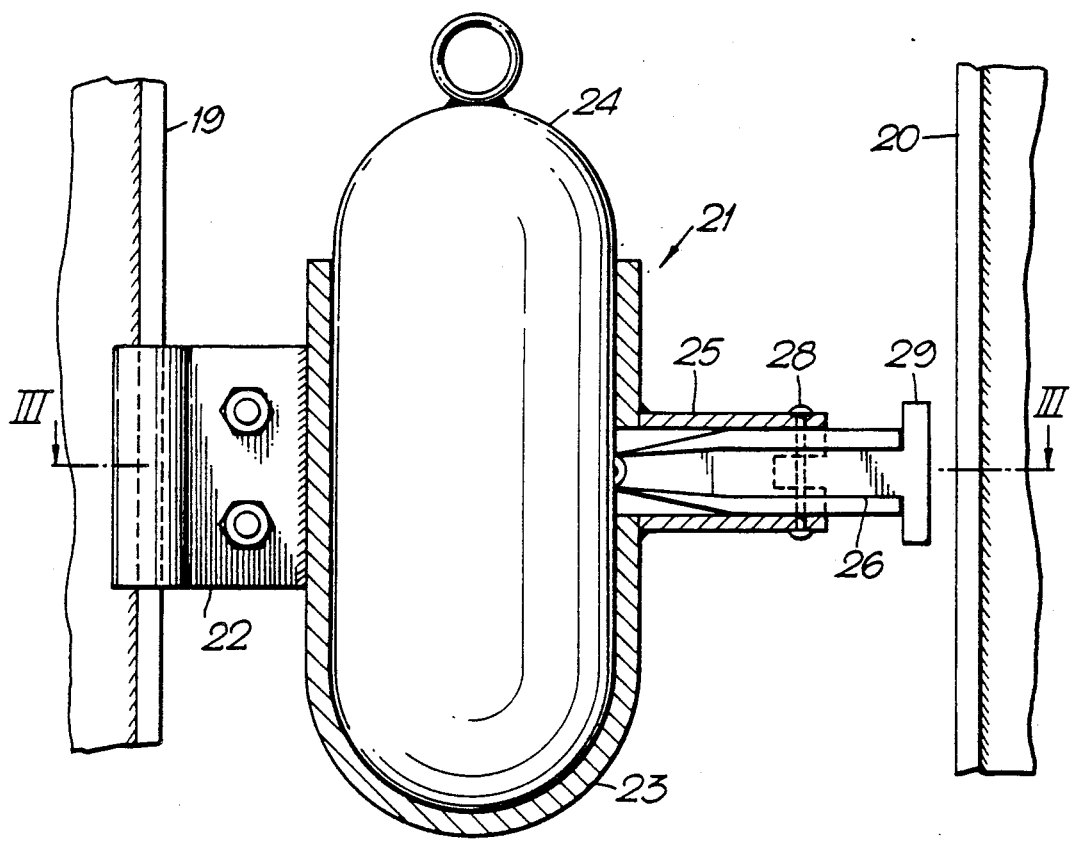
FIG. 2 shows a vertical cross section through a capsule and plunger fluid release device forming part of the system of FIG. 1.
Figure 3:
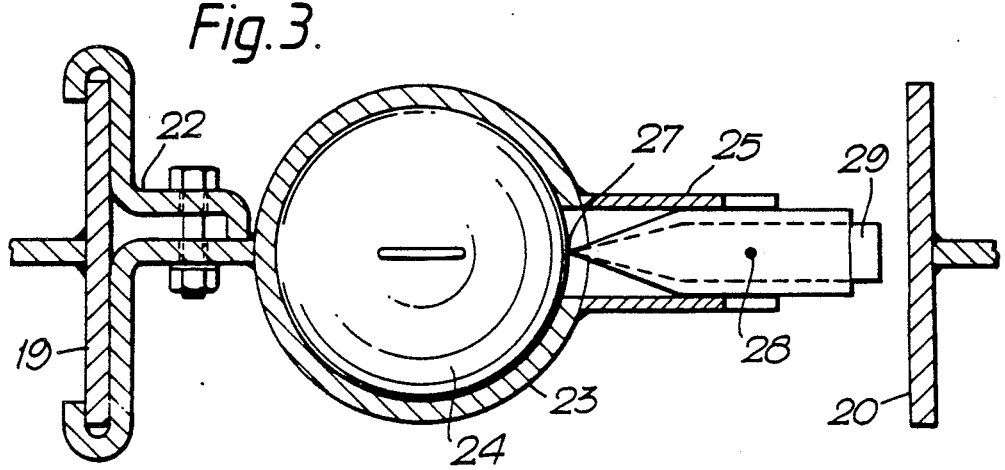
FIG. 3 shows a horizontal cross section on a line 111—111 of FIG. 2.

Each boiler unit has vertical stiffeners. Stiffeners 19 and 20 of two adjacent boiler units are shown in FIGS. 2 and 3. A release device 21 is attached to the stiffener 19 by means of a clamp 22. The device comprises a cylindrical housing 23 having a hemispherical bottom, into which housing a capsule 24 containing a tracer material, such as argon or neon gas is inserted At the side of the housing 23 opposite to the clamp is attached a horizontal cylinder 25 in which a plunger 26 is housed. The plunger has a sharp end 27 which is normally just clear of the capsule. The plunger is held in that position by a shear pin 28, which passes through the walls of the cylinder 25 and through a hole in the plunger 26. The plunger has a head 29 which is normally spaced, say, 10 mm from the stiffener 20 of the adjacent boiler unit.

In use of the system, if a support beam of the boiler unit having the stiffener 19 collapses, such that the boiler unit tilts so that the stiffener 19 moves towards the stiffener 20 of the adjacent boiler unit, the plunger head 29 of the plunger 26 will come into contact with the stiffener 20 with sufficient force to break the shear pin 28. The sharp end 27 of the plunger will pierce the capsule 24, which will therefore release the tracer material. The release device 21 is located in the path of part of the carbon dioxide coolant flow, and the tracer material will therefore be released into the coolant. The presence of the foreign tracer material in the coolant will be very quickly detected by the coolant monitoring and processing system 17 or 18, or by a burst fuel-can detection equipment (not shown) which is part of a conventional AGR.

It will be apparent that if the boiler unit associated with the stiffener 20 tilts so that the stiffener 20 moves into contact with the plunger 26, the capsule 24 will be pierced and will similarly provide a warning of abnormal boiler unit movement.

Instead of, or in addition to, piercing the shell of the capsule 24 the pl of the release device might pierce a barrier which separates two non-volatile materials, which, when mixed, react to produce a volatile product which then escapes into the coolant path and is detected. In some types of reactor, other than the AGR, the materials might be a metal and an acid. For example, zinc and sulphuric acid might be used to produce hydrogen as the tracer material.

It will be realized that the use of the present movement detection system in a nuclear reactor is very advantageous. Firstly, the detection system makes use of the coolant monitoring equipment which is already provided. The invention requires the addition of a simple tracer material release device which is cheap to produce, and many such devices can be located at suitable points around the reactor. The devices can be added to the reactor at any suitable time. The system gives an immediate indication that there has been an abnormal boiler unit movement, without awaiting shutdown and without relying on cable-severing techniques. Once a reactor has gone critical, work inside the reactor involving shutdown is time-consuming and involves considerable loss of electrical output. The release devices can be installed very rapidly. In a preferred system using an inert gas such as neon or argon, a gas chromatograph would preferably be used for gas analysis This could be easily installed as an addition to the coolant monitoring equipment already provided, and the additional cost would be negligible.

Although the movement detection system is described above in relation to boiler units in a nuclear reactor, a system which involves a release device and means to detect the presence of released material in accordance with the invention may be used for monitoring abnormal movement of any part of a gas-cooled reactor.

I claim:

1. A movement detection system for detecting abnormal movement of part of a nuclear reactor, the reactor having a path therein for gaseous coolant, the system comprising a container containing a tracer material which is releaseable into the coolant by piercing of the container as a result of said abnormal movement; and means to monitor the content of said coolant to detect the presence of released tracer material in the coolant.

2. A system as claimed in claim 1, wherein the tracer material is formed by the mixing of materials as a result of piercing of the container.

3. A system as claimed in claim 1, including plunger means operable as a result of said abnormal movement to cause release of the tracer material.

4. A system as claimed in claim 3, wherein said plunger means is normally restrained by a shear pin which is sheared by said movement.

5. A system as claimed in claim 1, wherein the container includes clamping means for clamping said container to said reactor part.

6. A system as claimed in claim 1, wherein the tracer material comprises an inert gas.

7. A system as claimed in claim 6, wherein said gas is argon.

8. A system as claimed in claim 6, wherein said gas is neon.

9. A system as claimed in claim 2, wherein said materials mixed comprise a metal and an acid, such as zinc and sulphuric acid.

10. A system as claimed in claim 1, wherein said part of the nuclear reactor comprises a boiler unit.

11. A nuclear reactor including a movement detection system as claimed in claim 1.

* * * * *